United States Patent Office 3,691,045
Patented Sept. 12, 1972

3,691,045
METHOD OF MAKING PHOTOCHROMIC FILMS ON GLASS SUBSTRATES
Morton L. Lieberman, Albuquerque, N. Mex., assignor to Corning Glass Works, Corning, N.Y.
No Drawing. Filed Mar. 15, 1971, Ser. No. 124,495
Int. Cl. C23c 15/00
U.S. Cl. 204—192                                                10 Claims

ABSTRACT OF THE DISCLOSURE

A method is disclosed for forming on a glass substrate a film exhibiting photochromic properties. A mixed oxide film containing silver oxide in addition to tantalum oxide, tungsten oxide, or mixtures thereof is reactively sputtered on a glass substrate. Excess silver oxide is removed from the film by immersing the film in an acid solution until the film, which is black to brown when deposited, becomes substantially colorless. The photochromic properties of the film are enhanced by heating the substrate-film composite at a temperature of at least 300° C. for at least ½ hour.

BACKGROUND OF THE INVENTION

This invention relates to a method of manufacturing glass articles having thin surface layers exhibiting photochromic properties.

The fundamental concepts pertaining to glasses exhibiting photochromic behavior are discussed in U.S. Pat. No. 3,208,860. That patent describes, in particular, inorganic silicate glasses containing submicroscopic crystals of a silver halide, viz., silver chloride, silver bromide, and silver iodide, which become darker in color when the glass is subjected to actinic radiation but which regain their original color when the actinic radiation is removed. As stated in that patent, this phenomenon is not fully understood but is believed to be the result of a reaction occurring between actinic radiation and the crystals dispersed in the glassy matrix, the absorptive qualities of the crystals to visible radiation being altered thereby.

For such uses as windows, ophthalmic lenses, building siding materials, and the like, photochromic glass of the type disclosed in U.S. Pat. No. 3,208,860 provides adequate optical density. Moreover, resolution is of no concern in these articles. However, information storage and display devices require photochromic material capable of providing high resolution. For example, U.S. Pat. No. 3,134,297 issued May 26, 1964, to C. O. Carlson et al. discloses the use of a thin sheet of organic photochromic material for the storage and display of information. Although the resolution of organic photochromic materials is adequate, unlike photochromic glass, they quickly fatigue and must be continuously replaced. Since sheets of photochromic glass which provide adequate contrast have not been able to provide the necessary resolution, photochromic fiber optic plates such as that disclosed in U.S. Pat. No. 3,506,782 issued Apr. 14, 1970, to R. D. Anwyl had to be used. These expensive fiber optic plates containing photochromic glass would be unnecessary if thin films of photochromic glass could be formed on substrates of conventional clear glass.

SUMMARY OF THE INVENTION

It ise therefore an object of the present invention to provide a method of forming on a glass substrate a thin film having photochromic properties.

Briefly, the method of the present invention comprises the following steps. A mixed oxide film containing silver oxide and an oxide selected from the group consisting of tantalum oxide, tungsten oxide and mixtures thereof is sputtered on a glass substrate. Since the deposited mixed oxide film is brown to black in color due to the presence of excess silver oxide is removed until the mixed oxide film becomes substantially colorless. To enhance the photochromic properties of the deposited film, the substrate-film composite is heated at a temperature of at least 300° C. for at least ½ hour.

DETAILED DESCRIPTION

The method of the present invention utilizes the reactive sputtering technique to deposit on a substrate a thin amorphous film having photochromic properties. Sputter deposition of thin film materials is accomplished by bombardment of one or more material sources in a vacuum by ions in such a way that source material is ejected and coats all line-of-sight surfaces Since this invention is concerned only with mixed oxide films, either multiple cathodes or alloy cathodes can be used in the sputtering apparatus. By appropriate design of the material source, which is typically in the form of a flat circular plate for alloy sputtering or a plurality of pie-shaped segments for multi-cathode sputtering, excellent thickness and composition uniformity can be obtained.

Sputtered compounds such as oxides can be deposited by reactive sputtering which is performed in an atmosphere containing a component of the material to be deposited. For example, silver oxide films can be obtained by sputtering from a silver cathode in an atmosphere containing oxygen in addition to an inert sputtering gas, which is usually argon. Although reactive sputtering can be performed in an atmosphere of pure oxygen or a mixture of oxygen and an inert gas such as xenon or argon, an argon-oxygen mixture is preferred.

All of the films to be hereinafter described were deposited by a multi-cathode sputtering apparatus of the type which is briefly described in my copending application S.N. 35,105 filed May 6, 1970, entitled "Amorphous Bismuth Oxide Containing Films." For a detailed description of a multi-cathode sputtering apparatus, reference may be made to the publications "Reactively Sputtered Oxide Films" by M. L. Lieberman and R. C. Medrud, Journal of the Electrochemical Society, February 1969, volume 116, pp. 242–247 and "Controlled Preparation of Alloys by Simultaneous Multitarget Sputtering" by P. R. Segatto, Journal of Vacuum Science and Technology, May/June, 1969, volume 6, Number 3, pp. 368–372. The basic sputtering unit is a modified Edwards evaporation plant comprising a television tube-shaped stainless steel dewar which extends through the top of a bell jar. Affixed to the bottom of the dewar is a circular copper plate to which a plurality of substrates may be affixed. The dewar may be filled with liquid nitrogen to cool the substrates during the sputtering operation; however, photochromic films have also been formed on uncooled substrates. Supports disposed under the dewar maintain a plurality of metal cathodes in proper relationship with respect to the substrates on which the photochromic film is to be deposited.

Fundamentally, this invention contemplates the formation on a substrate of an amorphous, photochromic film by the simultaneous sputtering of silver oxide in addition to tantalum oxide or tungsten oxide or a mixture of tantalum oxide and tungsten oxide. A detailed description of the formation of one such film will be followed by a table listing other examples. These mixed oxide films were prepared by sputtering in a 1:1 Ar-O$_2$ gas mixture in the previously described sputtering apparatus. D.C. voltages applied to the individual cathodes were independently varied in different deposition runs to obtain films of different composition. It is noted that R.F. reactive sputttering would also result in the formation of photochromic films and that faster deposition rates may be possible with that technique. The glass substrates were rotated above the cathodes at a rate of about 120 r.p.m. to minimize layering in the films, the deposition never exceeding one angstrom per substrate revolution. A vacuum line connected to the bell jar maintained the pressure between 15 and 37 microns during deposition of the hereinafter described films, but this pressure range is not critical, and those familiar with the sputtering art will be able to readily determine the deposition pressure for a given deposition run wherein such parameters as the cathode materials and voltages, deposition atmosphere and desired deposition rate are known.

Example I

Two pie-shaped cathode segments, one silver and one tantalum, were mounted on the cathode support of a sputtering chamber. Four transparent glass substrates were cleaned and then mounted at the bottom of the dewar above the cathodes. The cleaning process consisted of subjecting the substrates to a light HF dip, after which they were rinsed first in water, then rinsed in methanol and dried. After the cleaned substrate was secured to the bottom of the dewar, the sputtering chamber was closed and pumped to a pressure of about $1.9 \times 10^{-7}$ torr. A sputtering gas mixture consisting of about 50% argon and 50% oxygen was introduced into the sputtering chamber. Four minutes after gas flow was initiated sputtering was initiated by applying 1500 volts to the silver cathode and 3800 volts to the tantalum cathode. The current flowing through the tantalum cathode was 175 ma. throughout the entire sputtering operation which lasted 180 minutes. During the first twenty one minutes of sputteirng, the pressure in the chamber fluctuated between 11 microns and 14 microns, but it remained substantially constant at 15 microns for the remainder of the run. The current flowing through the silver cathode varied from 34 ma. to 42 ma. during the first 66 minutes of sputtering, after which it remained substantially constant at about 36 ma.

Further examples pertaining to the deposition of mixed oxide films of silver and tantalum oxides, silver and tungsten oxides, and silver, tantalum and tungsten oxides are given in Table I. In these examples, such conditions as substrate preparation and sputtering chamber preparation are similar to those of Example 1. Table I lists such variable parameters as cathode voltages and currents, average chamber pressure and total elapsed time during sputtering.

TABLE I

| Example | Silver cathode Kv. | Silver cathode Ma. | Tantalum cathode Kv. | Tantalum cathode Ma. | Tungsten cathode Kv. | Tungsten cathode Ma. | Average pressure (microns) | Elapsed time (min.) |
|---|---|---|---|---|---|---|---|---|
| 2 | 1.5 | 39 | 3.7 | 175 | | | 20 | 50 |
| 3 | 1.5 | 44 | 3.6 | 175 | | | 17 | 90 |
| 4 | 1.5 | 42 | 4.5 | 250 | | | 17 | 120 |
| 5 | 1.5 | 36 | 3.8 | 175 | | | 17 | 589 |
| 6 | 1.5 | 60 | | | 3.6 | 175 | 27 | 180 |
| 7 | 1.5 | 50 | | | 3.6 | 175 | 37 | 180 |
| 8 | 1.5 | 56 | | | 4.2 | 200 | 25 | 180 |
| 9 | 1.5 | 50 | | | 4.8 | 225 | 25 | 180 |
| 10 | 1.5 | 40 | 3.8 | 175 | 3.6 | 70 | 21 | 78 |
| 11 | 1.5 | 39 | 3.8 | 175 | 3.6 | 72 | 20 | 150 |
| 12 | 1.5 | 44 | 3.8 | 175 | 3.6 | 98 | 18 | 150 |
| 13 | 1.5 | 42 | 3.8 | 175 | 4.2 | 120 | 17 | 150 |
| 14 | 1.5 | 44 | 3.8 | 175 | 4.8 | 150 | 17 | 150 |
| 15 | 1.2 | 36 | 3.8 | 175 | 3.6 | 95 | 17 | 150 |
| 16 | 1.2 | 34 | 3.8 | 175 | 4.2 | 81 | 20 | 150 |

These sputtered films were brown to black in color because of the presence of excess silver oxide. When these films were immersed in about 8 N nitric acid, the excess silver oxide was removed as evidenced by a conversion to substantially transparent, colorless films. Other acids capable of dissolving silver oxide, such as perchloric acid, sulfuric acid and acetic acid could be used. Obviously, the concentration of the acid is not critical, but a weaker acid must be employed for a longer period of time to obtain clear films. After the etching treatment, some photochromic properties were observed. However, after the films had been etched, rinsed in water and then in methanol and dried, the photochromic properties thereof were greatly enhanced by heating them for at least ½ hour at a temperature of at least 300° C., the specific temperature range depending on composition. To determine an optimum heat treatment for each type of film, the films of Examples 2 through 16 were subjected to various heat treatments similar to those described below in connection with films produced in accordance with the conditions set forth in Example 1. Five samples produced in accordance with Example 1, hereinafter referred to as samples 1A through 1E, were subjected to the following heat treatments after etching. Sample 1A was heated at 300° C. for about 12 hours. Samples 1B, 1C, 1D and 1E were heated for one hour at 350° C., 400° C., 500° C. and 600° C., respectively. After being exposed to ultraviolet light having a wavelength of 2537 A., samples 1D and 1E had darkened, and samples 1A, 1B and 1C had darkened considerably, samples 1B and 1C both exhibiting good contrast. After subjecting films produced by the conditions set forth in Examples 2–5 to similar heat treatments, it was determined that silver oxide-tantalum oxide films exhibited maximum absorption on exposure to ultraviolet light at 2537 A. after being heated for at least ½ hour at a temperature between 300° C. and 400° C. Although films having relatively good photochromic properties were obtained by heating them for about one hour, heat treatments as long as seventeen hours also produced enhanced photochromic properties. The heat treatment should be performed at a temperature less than 800° C. since some films began to fracture or crystallize when heated to that temperature.

The films were generally a few thousand angstroms thick. The thickness of the film produced by Example 3 was 2,100 A. and that produced in accordance with the conditions set forth in Example 5 was 16,500 A. The film of Example 5 was made much thicker than those of the other examples to determine the effect of the increased thickness on the film properties. After the film of Example 5 was etched it had a frosty white color. The film was then heat treated at 350° C. for one hour and then subjected to ultraviolet radiation. The contrast of this film was no better than that of the films which were only a few thousand angstroms thick. Films should be at least 1,000 A. thick to provide detectable photochromic properties.

By subjecting the films produced by the conditions set forth in Examples 5–16 to heat treatments similar to those described in conjunction with Example 1, it was determined that the silver oxide-tungsten oxide films and the silver oxide-tungsten oxide-tantalum oxide films exhibited maximum absorption after heat treatment at a temperature between 500° C. and 600° C. Of the three types of films produced in accordance with the conditions set forth in Examples 1–16, the silver oxide-tantalum oxide film exhibited the greatest absorption. A silver oxide-tantalum oxide-tungsten oxide film heated to 600° C. for one hour exhibited more uniform properties, better edge definition and lower background absorption than the other films.

The bleaching characteristics of the film appeared to be highly variable. Some films bleached slowly in visible light, some could be thermally bleached at about 300° C. and others could not be bleached. For example, films of silver oxide and tantalum oxide which had been heat treated at a temperature between 350° C. and 400° C. exhibited the greatest propensity for bleaching under visible light. These same films heated at 300° C. for 17 hours could be thermally bleached by heating them for about 10 minutes at 300° C., and films heated at 300° C. for one hour would not bleach in visible light.

What is claimed is:

1. The method of forming on a glass substrate a film exhibiting photochromic properties, the steps of which comprise:

sputtering on a glass substrate a mixed oxide film containing silver oxide and an oxide selected from the group consisting of tantalum oxide, tungsten oxide, and mixtures thereof, removing excess silver oxide until said mixed oxide film becomes substantially colorless, and heating said substrate-film composite at a temperature of at least 300° C. for at least ½ hour.

2. The method in accordance with claim 1 wherein the step of removing excess silver oxide comprises etching said film to dissolve excess silver oxide.

3. The method in accordance with claim 2 wherein the step of etching said film comprises immersing said film in a nitric acid solution.

4. The method of claim 1 wherein the step of sputtering a mixed oxide film comprises reactively sputtering said film in an oxygen containing atmosphere in a multi-cathode sputtering apparatus.

5. The method in accordance with claim 1 wherein the step of sputtering said mixed oxide film comprises sputtering a film containing silver oxide and tantalum oxide, and said heating step comprises subjecting said substrate-film composite to a temperature between 350° C. and 400° C.

6. The method in accordance with claim 1 wherein the step of sputtering said mixed oxide film comprises sputtering a film containing silver oxide and an oxide selected from the group consisting of tungsten oxide and mixtures of tungsten oxide and tantalum oxide, and said heating step comprises subjecting said substrate-film composite to a temperature between 500° C. and 600° C.

7. The method of forming on a glass substrate a film exhibiting photochromic properties, the steps of which comprise:

providing a glass substrate, sputtering on said substrate a mixed oxide film containing silver oxide and an oxide selected from the group consisting of tantalum oxide, tungsten oxide, and mixtures thereof, immersing said film in a nitric acid solution until said mixed oxide film becomes substantially colorless, and heating said film-substrate composite at a temperature of at least 300° C. for at least ½ hour.

8. The method in accordance with claim 7 wherein the step of sputtering a mixed oxide film comprises reactively sputtering said film in an oxygen containing atmosphere in a multi-cathode sputtering apparatus.

9. The method in accordance with claim 8 wherein the step of reactively sputtering said film comprises sputtering a film containing silver oxide and tantalum oxide, and said heating step comprises subjecting said substrate-film composite to a temperature between 350° C. and 400° C.

10. The method in accordance with claim 8 wherein the step of reactively sputtering said mixed oxide film comprises sputtering a film containing silver oxide and an oxide selected from the group consisting of tungsten oxide and mixtures of tungsten oxide and tantalum oxide, and said heating step comprises subjecting said substrate-film composite to a temperature between 500° C. and 600° C.

References Cited

UNITED STATES PATENTS

| 3,208,860 | 9/1965 | Armistead et al. | 96—90 PC |
|---|---|---|---|
| 3,528,906 | 9/1970 | Cash et al. | 204—192 |
| 3,530,055 | 9/1970 | Maissel et al. | 204—192 |

JOHN H. MACK, Primary Examiner

S. S. KANTER, Assistant Examiner

U.S. Cl. X.R.

90—88